Patented Sept. 26, 1944

2,358,807

UNITED STATES PATENT OFFICE 2,358,807

HYDANTOINIMIDE DERIVATIVES OF PROTEINS AND ALPHA AMINO ACIDS AND PROCESS

Oskar Huppert, Chicago, Ill., assignor to The Glidden Company, Cleveland, Ohio, a corporation of Ohio No Drawing. Application April 21, 1941, Serial No. 389,622. In Germany August 1, 1939

21 Claims. (Cl. 260—112)

The present invention relates to new chemical compounds and to their production and more particularly it relates to new compounds derived from proteins, protein hydrolysates and from alpha amino acids.

In United States Patent No. 2,112,210 there is described a process in which protein hydrolysates and amino acids are changed into disulfides by treating them with carbon disulfide at a hydrogen ion concentration which at most corresponds to that of a solution of calcium hydroxide and oxidizing the thus sulfurized material to form the disulfide. Proteins themselves may also be employed in the preparation of the disulfides.

It has been found that these disulfides react with compounds containing primary and secondary amino groups and with ammonia, and their salts, to form a new class of compounds. The disulfides so produced according to the above mentioned patent are believed to contain the disulfide group

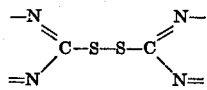

in which there are double bonds adjacent to the disulfide linkage, and it is believed that the reaction is in accordance with the rule of Fromm (Annalen 349, page 146). The reaction may be carried out at elevated or at room temperature.

Where hydrolysates are used the degree of hydrolysis may vary, and the hydrolysates may or may no tretain their essential protein-like properties. The hydrolysis may be effected in any suitable manner such as by acid, alkali or enzyme.

Any suitable primary or secondary amino compound or ammonia, or their salts, may be employed to react with the disulfide. The amino compound may itself be protein or a protein hydrolysate, or may be an aliphatic, carboxylic, aromatic, hydrogenated aromatic, alicyclic, heterocyclic, or other type of amine. The aminocompound used may contain only one, or more than one primary and/or secondary amino group, such as urea, thiourea, guanidine, hexamethylene diamine, piperidine, etc. in addition to protein and protein hydrolysates. The amino groups may also be present in dyestuffs employed to dye artificial fibers and other articles containing the protein disulfide prepared in accordance with the aforementioned patent.

The reactions involved may be illustrated by the following equations in which R represents the rest of a protein hydrolysate and $R_1$ the rest of a primary amino compound.

(1) $2(R-NH-CO-CH_2-NHH)+2CS_2 \longrightarrow$
  $2(R-NH-CO-CH_2-NHCSSH) \longrightarrow$
  $2(R-\underset{|_____|}{N-CO-CH_2-N=CSH})+2H_2S$ (2) $2(R-\underset{|_____|}{N-CO-CH_2-N=CSH})+O \longrightarrow$
  $H_2O+(R-\underset{|_____|}{N-CO-CH_2-N=C-S})_2$ (3) $(R-\underset{|_____|}{N-CO-CH_2-N=C-S})_2+R_1NH_2 \longrightarrow$
  $R-\underset{|_____|}{N-CO-CH_2-N=C-NHR_1}+$
  $R-\underset{|_____|}{N-CO-CH_2-N=C-SH}+S$ It will be noted that the product of Equation 1 is a thio hydantoin which upon oxidation is converted into the disulfide in Equation 2. Equation 3 shows the reaction of this disulfide with a primary amino compound, with the production of an hydantoin imide.

As previously indicated, however, the amino compound may either be a primary or secondary amino compound or ammonia and their salts. Thus the compounds contemplated by the present invention are those having the probable structural formula

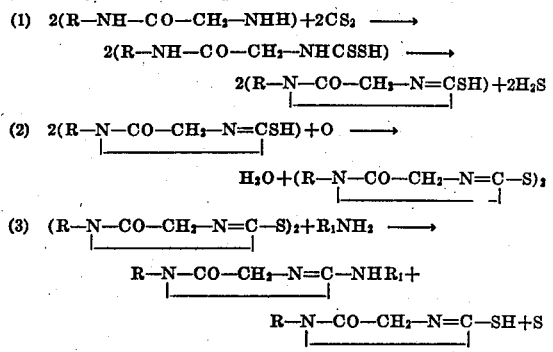

and their salts, in which R denotes the rest of the protein molecule or an alpha amino acid, and $R_1$ and $R_2$ denote either hydrogen, alkyl, alicyclic, aralkyl aromatic or heterocyclic radicals.

The products of the present invention may be employed in various ways and for various purposes. They have been found particularly valuable in connection with the manufacture of artificial fibers, films and the like. Certain of the protein disulfides themselves form suitable spinning solutions, and the spun fibers, films and the like may be subsequently treated with the amino compounds in various ways and for various purposes. Also either hydrolyzed or unhydrolyzed protein containing the free amino groups may be treated with the disulfides, either before or after spinning, to form spinning solutions or to improve the quality of the fiber. Thus mixtures of protein, either hydrolyzed or unhydrolyzed, and protein disulfide may be allowed to react before spinning. In this manner soya protein fibers may be improved, and in certain cases satisfactory spinning solutions may be prepared from soya protein by treatment thereof with the protein disulfide, which soya protein alone would not be suitable. Also a soya protein fiber spun from a spinnable solution may be improved by immersion in an after-treatment bath containing the protein disulfide, such as thio-gelatine, which is the disulfide prepared in accordance with United States Patent No. 2,112,210, employing gelatine as the starting material.

When the amino compound is proteinaceous in character the product is an hydantoin imide derivative of protein. Thus if the substance initially employed in the preparation of the disulfide also retains its essential protein character it is seen that there is a linear build-up of a molecule from essentially protein material, and it is believed that this linear structure results in improved fiber forming qualities. In any event fibers formed from such a material are more elastic, spin better, are less brittle and more resistant to swelling.

The compounds are also suitable for other purposes. For example, thio-gelatine prepared in accordance with United States Patent No. 2,112,210, when boiled with ammonium chloride produces a substance which is poisonous per se, and fatal to rabbits in 3 minutes. This product is also suitable for use as an insecticide. Also the disulfide of thio-hydantoin amino acetic acid may be reacted according to Equation 3 with an insulin solution containing free amino groups to produce, after separation of sulfur, a solution which when taken orally reduces the proportion of sugar in blood.

*Example I*

720 grams of isolated soya protein are mixed with 5 liters of water containing 90 cc. of hydrochloric acid, and one gram of pepsin and 14 grams of thio-gelatin prepared by treating gelatine in accordance with United States Patent No. 2,112,210 is well stirred into the suspension. This suspension is held at 25° C. for 6 hours, filtered or centrifuged and washed. The product may be employed in the preparation of spinning solutions. In place of the thio-gelatine, other protein disulfides such as the thio-soya protein, thio-casein, etc., may be used.

*Example II*

800 grams of the product formed in Example I is dissolved in 4.2 liters of water containing 40 grams of sodium hydroxide. The solution thus formed is allowed to stand one or two days and after being freed from air is spun in the form of fibers into a precipitation bath comprising 8% sulfuric acid and 4% of 40% formaldehyde at 30° C. The composition of the precipitation bath may be altered or changed in various ways such as by the addition of salts, organic compounds, etc. The fibers are then hardened in a bath containing 5% formaldehyde. The fibers may be washed, dried, after-treated, stretched, cut into staple fibers, curled and otherwise made ready for sale.

*Example III*

720 grams of soya protein are mixed with 5 liters of water containing 90 cc. hydrochloric acid and one to two grams of pepsin according to its activity is then added with stirring. This suspension is held at 25° C. for 6 to 12 hours. 800 grams of the thus treated protein on the dry basis is then dissolved in 4.2 liters of water with the aid of 20 grams of sodium hydroxide, and 20 grams of yellow thiogelatine is stirred into the solution. The solution so prepared is aged two days, the air removed, and then spun into fibers into a precipitating bath containing 4% sulfuric acid and 4% formaldehyde.

*Example IV*

300 grams of hydrolyzed soya protein are dissolved in 1560 cc. of water containing 15 grams of sodium hydroxide. The solution so obtained is allowed to ripen one or two days, and after being freed from air is spun into a precipitation bath containing 25% sulfuric acid and 15% sodium sulfate. The fibers are then hardened in a bath containing 5% formaldehyde and 8% sodium chloride. After washing, the fibers are then immersed for 15 minutes in an after-treatment, an aqueous bath containing 2% thiogelatine, 2% of a long chain alcohol sulfate (Duponol), 1% paraffin, 2% diglycolstearate and 20% ethylene glycol mono-ethyl ether (Cellosolve). The fibers so treated showed an increased tensile strength over fibers treated in the same manner but omitting the thio-gelatine from the after-treatment bath.

*Example V*

300 grams of hydrolyzed soya protein are added to 1410 cc. of water and 150 cc. of 10% caustic soda solution added to produce a pH of 9 to 10. After warming the solution to 45° C., 23 cc. of carbon disulfide is added with stirring. The stirring is continued for one-half hour whereby the pH is lowered to 6–7. Air is bubbled into the solution at 60° C. for one hour, with vigorous stirring, and the mixture is then allowed to cool to room temperature, with stirring. The solution is then aged, freed from air and spun into a precipitation bath. After hardening and washing the fibers are then soaked for 15 minutes in a bath containing 1% long chain alcohol sulfate, 1½% sulphonated castor oil (Monopol oil), ¼% mineral oil, ½% diglycol stearate, ½% paraffin, 20% glycol and 2% thiogelatine.

The treatment of the soya protein to prepare the disulfide does not completely remove all of the free amino groups, about 30% remaining, and these remaining free amino groups are available for reaction with the disulfide group present in the thiogelatine.

*Example VI*

1100 grams of casein are soaked in 5456 cc. of water at 24° C. for 3 hours with stirring. 258 cc. of a 21.5% solution of sodium hydroxide is then added, and after three hours the solution is heated to 45° C. At this temperature 80 cc. of carbon disulfide is added and the mixture stirred for half an hour, whereby the pH is lowered from 9–10 to 6–7. Air is bubbled into the solution for one hour at a temperature of 60° C. After adding 44 grams of urea or 50 grams of stearylamine the solution is spun into fibers according to known methods. After hardening, the fibers are soaked for 5 minutes in a 2% solution of sodium nitrite, washed, and after washing immersed for 15 minutes in a solution of 1% Igepon, ½% sulphonated castor oil, ½% mineral oil, 2% stearyl oxy-methyl pyridinium chloride, 20% glycerol and 1% thio-gelatine. The fibers are then dried at a temperature below 60° C. and after drying exposed to a temperature of 120° C. for three minutes.

Example VII 300 grams of hydrolyzed soya protein are added to 1410 cc. of water and 150 cc. of 10% caustic soda solution added to produce a pH of 9 to 10. After warming the solution to 45° C., 23 cc. of carbon disulfide is added with stirring. The stirring is continued for one-half hour whereby the pH is lowered to 6–7. Air is bubbled into the solution at 60° C. for one hour, with vigorous stirring, and the mixture is then allowed to cool to room temperature, with stirring. Then 18 g. diethylendiamin are added and well stirred. The solution is then aged, freed from air and spun into a precipitation bath. After hardening and washing the fibers are then soaked for 15 minutes in a bath containing 1% long chain alcohol sulfate, 1½% sulphonated castor oil (Monopol oil), ¼% mineral oil, ½% diglycol stearate, ½% paraffin, 20% glycol and 2% thiogelatine.

The treatment of the soya protein to prepare the disulfide does not completely remove all of the free amino groups, about 30% remaining, and these remaining free amino groups are available for reaction with the disulfide group present in the thiogelatine.

Example VIII

To 1000 cc. of a 20% solution of "thiogelatine" prepared from the gelatine according to United States Patent No. 2,112,210 are added 16 g. ammonium chloride and the mixture boiled one hour. The separated sulphur is filtered off and the solution is evaporated on a drum dryer to a powder.

Example IX 75 g. of amino acetic acid are dissolved in 600 cc. of water and 40 g. calcium oxide hydrate are added. The solution is filtered and then shaken with 70 cc. carbon disulphide at 25° C. for one hour. The excess of carbon dissulphide is then removed, 20 g. of flowers of sulphur are added, and the solution is vigorously boiled for half an hour and the resulting blood-red solution is filtered once more.

30 cc. of this solution are added to 1000 units of a solution of insulin. After 24 hours the sulphur is separated and there is obtained a solution of an insulin which is efficacious when taken orally.

It is to be understood that the detailed disclosure is merely illustrative of the invention and that many modifications and changes may be made therein and other modes of carrying out the invention may be employed without departing from the spirit and scope of the invention.

The application is a continuation-in-part of application Serial No. 310,190 filed December 20, 1939, and application Serial No. 334,920 filed May 13, 1940.

Having described the invention what is claimed is:

1. As a new composition of matter the product resulting from the reaction of a disulfide formed by treating a material selected from the class consisting of protein, protein hydrolysates, and alpha amino acids with carbon disulphide at a pH which corresponds at most to that of a solution of calcium hydroxide and oxidizing the thus sulfurized hydrolysate to form the disulfide, with a compound selected from the class consisting of ammonia, ammonium salts, compounds containing primary amino groups and compounds containing secondary amino groups.

2. The composition of claim 1 in which the disulfide is prepared from soya protein.

3. The composition of claim 1 in which the compound containing an amino group is a soya protein.

4. The composition of claim 1 in which the compound containing an amino group is hydrolyzed soya protein.

5. The composition of claim 1 in which the compound containing an amino group is hydrolyzed soya protein and the disulfide is prepared from gelatine.

6. The composition of claim 1 in which the compound containing an amino group is hydrolyzed soya protein and the disulfide is a soya protein disulfide.

7. The composition of claim 1 in which the compound containing an amino group is a polyamino compound.

8. A protein derivative of an hydantoin imide.

9. A soya protein derivative of an hydantoin imide.

10. An amino derivative of a protein hydantoin.

11. The process comprising reacting a disulfide formed by treating a substance selected from the class consisting of protein, protein hydrolysates and alpha amino acids with carbon disulfide at a pH which corresponds at most to that of a solution of calcium hydroxide and oxidizing the thus sulfurized protein to form the disulfide, with a compound selected from the class consisting of ammonia, ammonium salts, compounds containing primary amino groups and compounds containing secondary amino groups.

12. The process of claim 11 in which the disulfide is prepared from a soya protein.

13. The process of claim 11 in which the compound containing an amino group is hydrolyzed soya protein.

14. The process of claim 11 in which the disulfide is prepared from gelatine and the compound containing an amino group is soya protein.

15. In a process for preparing artificial fibers the steps which comprise preparing a spinning solution of soya bean protein, spinning said solution into fibers, coagulating and hardening the fibers, and treating the soya bean protein in the hardened fiber with a protein disulfide formed by treating a protein hydrolysate with carbon disulfide at an hydroxyl ion concentration which at most corresponds to that of a solution of calcium hydroxide and oxidizing the thus sulfurized material to form the disulfide.

16. The process which comprises treating an artificial fiber comprising soya bean protein with a protein disulfide formed by treating a protein hydrolysate with carbon disulfide at an hydroxyl ion concentration which at most corresponds to that of a solution of calcium hydroxide in water and oxidizing the thus sulfurized material to form the disulfide.

17. An artificial fiber comprising the reaction product of a disulfide formed by treating a protein hydrolysate with carbon disulfide at an hydroxyl ion concentration which at most corresponds to that of a solution of calcium hydroxide and oxidizing the thus sulfurized material to form the disulfide, and a compound selected from the class consisting of ammonia, ammonium salts, compounds containing a primary amino group, and compounds containing a secondary amino group, at least one of said reacting substances being essentially proteinaceous in character.

18. Compounds selected from the class consisting (1) of those having the probable structural formula

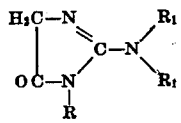

in which R represents the rest of a compound selected from the class consisting of proteins; protein hydrolysates and alpha-amino acids, and $R_1$ denotes radicals selected from the class consisting of hydrogen, aliphatic, alicyclic, aromatic, heterocyclic and aralkyl radicals, and (2) their salts when both $R_1$ radicals are hydrogen.

19. The process of claim 11 in which the disulfide is prepared from casein.

20. The artificial fiber of claim 17 in which the compound reacted with the protein hydrolysate disulfide is a soya protein.

21. An artificial fiber comprising the reaction product of a disulfide formed by treating casein with carbon disulfide at an hydroxyl ion concentration which at most corresponds to that of a solution of calcium hydroxide and oxidizing the thus sulfurized material to form the disulfide and a compound selected from the class consisting of ammonia, ammonium salts, compounds containing primary amino groups, and compounds containing secondary amino groups.

OSKAR HUPPERT.